US009959502B2

(12) United States Patent
Flores et al.

(10) Patent No.: US 9,959,502 B2
(45) Date of Patent: May 1, 2018

(54) UTILIZING A DYNAMIC DATA SOURCE TO AFFECT BUSINESS RULE MANAGEMENT

(71) Applicant: INTERNATIONAL BUSINESS MACHINES CORPORATION, Armonk, NY (US)

(72) Inventors: Romelia H. Flores, Keller, TX (US); Charlet N. Givens, Dallas, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 13/621,258

(22) Filed: Sep. 16, 2012

(65) Prior Publication Data

US 2014/0081897 A1    Mar. 20, 2014

(51) Int. Cl.
*G06Q 10/06* (2012.01)
*G06N 5/02* (2006.01)

(52) U.S. Cl.
CPC ........... *G06N 5/025* (2013.01); *G06Q 10/067* (2013.01)

(58) Field of Classification Search
CPC combination set(s) only.
See application file for complete search history.

(56) References Cited

U.S. PATENT DOCUMENTS

| 8,140,362 | B2 | 3/2012 | Deshpande et al. |
| 2006/0074726 | A1* | 4/2006 | Forbes et al. ..................... 705/7 |
| 2007/0214099 | A1* | 9/2007 | Marfatia et al. ............... 706/20 |
| 2008/0104092 | A1* | 5/2008 | Cummins ..................... 707/101 |
| 2011/0218842 | A1* | 9/2011 | Addala et al. .............. 705/7.39 |
| 2012/0109708 | A1* | 5/2012 | Mueller et al. ............. 705/7.27 |
| 2012/0131542 | A1* | 5/2012 | DeAngelis et al. .......... 717/104 |
| 2013/0238487 | A1* | 9/2013 | Biske ............................. 705/39 |

* cited by examiner

*Primary Examiner* — Mark A Fleischer
(74) *Attorney, Agent, or Firm* — Steven M. Greenberg, Esq.; CRGO Law

(57) ABSTRACT

Dynamic data discovery can identify variables or changes in a business environment which can impact existing business rules and can match identified triggers. A business rule associated with a business rule management system can be identified. The business rule management system can be a component of an enterprise organization. The rule can be an operation, a definition, and a constraint associated with the organization. The organization can be a person, a process, a product, a service, or a computing device. Relevant information can be determined from a dynamic data associated with a data source. The determination can be made through the use of semantic analysis. A business pattern associated with the rule can be semantically matched with a dynamic pattern associated with the information. The pattern can be a semantic pattern of the information. A new business rule can be automatically generated from the dynamic data analysis.

18 Claims, 3 Drawing Sheets

UTILIZING A DYNAMIC DATA SOURCE TO AFFECT BUSINESS RULE MANAGEMENT

BACKGROUND

The present invention relates to the field of business rule management and, more particularly, to utilizing a dynamic data source to affect business rule management.

Business rules which can aid in organizing, implementing, and achieving business objectives can range from simple to highly complex. Business rules are traditionally managed by business rules management systems (BRMS). These management systems often require a manual update and approval by multiple business users before a business rule can be modified. This can result in significant time delays which can drive up decision and implementation costs. For example, if there is a change to raw material prices, a manufacturer must manually adjust their product pricing to compensate for the change in raw material price. Currently there is no tool or methodology to accommodate the dynamic nature of the business environment.

Further, due to the vast quantities of data sources in the business environment, business analysts can be overwhelmed, resorting to utilizing only a few key resources. For example, many Big Data sources which can vary from terabytes to petabytes of information are too cumbersome for human management and/or consumption. Additionally, disparate organization of sources creates another hurdle which business analysts must overcome before utilizing critical information from these sources. For example, important Internet articles, news feeds, and social network information can go unleveraged due to the loosely organized relationships they have with each other. That is, current methodologies for organizing and/or analyzing disparate data sources can be time and cost prohibitive.

BRIEF SUMMARY

One aspect of the present invention can include a system, an apparatus, a computer program product, and a method for utilizing a dynamic data source to affect business rule management. Dynamic data discovery can identify variables and/or changes in a business environment. The dynamic data can impact existing business rules and can be discovered through matching identified triggers. A business rule associated with a business rule management system can be identified. The business rule management system can be a component of an enterprise organization. The business rule can be an operation, a definition, and a constraint associated with the organization. The organization can be a person, a process, a product, a service, or a computing device. Relevant information can be determined from a dynamic data associated with a data source. The determination can be made through the use of semantic analysis. A business pattern associated with the rule can be semantically matched with a dynamic pattern associated with the relevant information. The dynamic pattern can be a semantic pattern of the relevant information. A new business rule can be automatically generated from the dynamic data analysis.

Another aspect of the present invention can include a method, an apparatus, a computer program product, and a system for utilizing a dynamic data source to affect business rule management. A rule engine can dynamically manage a business rule associated with a business rule management system. The business rule management system can be a component of an enterprise organization. The business rule can be an operation, a definition, or a constraint associated with the organization. The organization can include a person, a process, a product, a service, or a computing device. A data store can be configured to persist a business pattern, a dynamic data, a trigger, or the rule.

DETAILED DESCRIPTION

Figure 1:
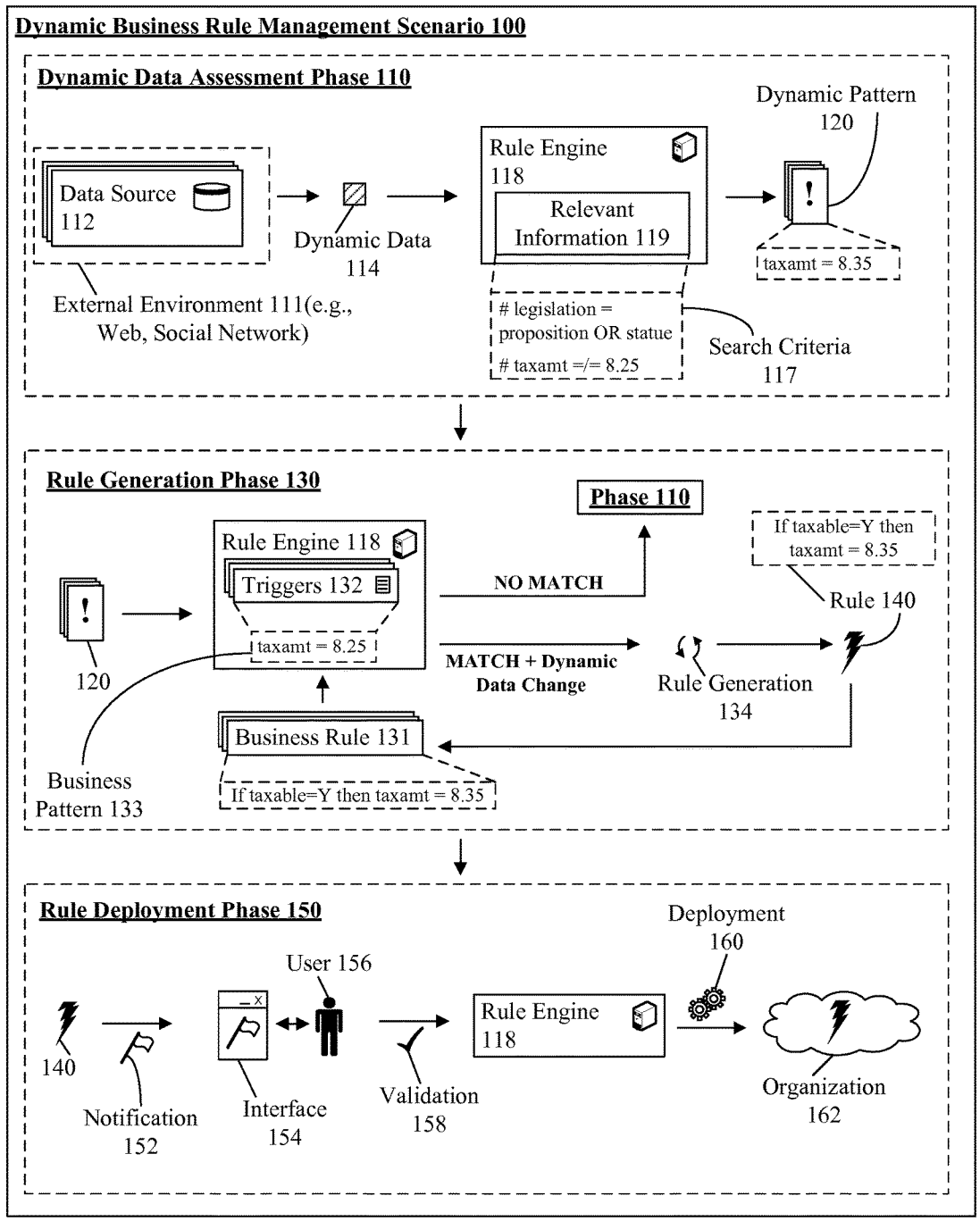
FIG. 1 is a schematic diagram illustrating a scenario for utilizing a dynamic data source to affect business rule management in accordance with an embodiment of the inventive arrangements disclosed herein.

The present disclosure is a solution for utilizing a dynamic data source to affect business rule management. In the solution, dynamic data sources can be monitored for information relevant to one or more business rules. Data sources can include, but is not limited to, data feeds, trading reports, Internet articles, and the like. In one instance, semantic analysis can be utilized to determine relevancy and urgency of information within the data sources. When relevant information is determined, the information can be evaluated to determine business rules which can be affected by the information. In one embodiment, the information can be utilized to modify an existing business rule based on the information. In another instance, the information can be utilized to create a new business rule based on the information. In one embodiment, the disclosure can permit the automatic generation and deployment of business rules. It should be appreciated that the disclosure can permit manual supervisory of the process described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 100 for utilizing a dynamic data source to affect business rule management in accordance with an embodiment of the inventive arrangements disclosed herein. Scenario 100 can be performed in the context of method 200 and/or system 300. In one embodiment, scenario 100 can include distinct phases 110, 130, 150. Phases 110, 130, 150 can be performed in serial and/or in parallel. Phases 110, 130, 150 can be performed in the order presented and/or out of order. In scenario 100, a dynamic data 114 can be obtained from a data source 112. The data 114 can be filtered into relevant information 119 via search criteria 117. The information 119 can be semantically analyzed to determine a dynamic data pattern 120. The dynamic pattern 120 can be semantically matched to a business pattern 133 (e.g., from business rule 131) to determine a business rule management action (e.g., rule generation 134). In one instance, the disclosure can automatically generate an appropriate rule 140 which can be deployed. That is, the disclosure can enable an enterprise organization to be agile by automatically responding to a fluid business environment.

As used herein, external environment 111 can be one or more computing systems communicatively linked to rule engine 118. Environment 111 can include, but is not limited to, the Internet, a social network, a feed aggregator, and the like. In one instance, the disclosure can leverage desktop applications such as news readers to obtain dynamic data. For example, the disclosure can determine one or more articles read by a user which can be identified as the dynamic data 114. Dynamic data 114 can include structured and/or unstructured data associated with the data store 112. Relevant information 119 can include one or more portions of dynamic data 112 which can be utilized to create a dynamic pattern 120. Pattern 120 can be one or more semantic patterns extracted from relevant information 119. In one instance, pattern 120 can conform to an Extensible Markup Language format. In another instance, pattern 120 can conform to a Boolean expression. It should be appreciated that the disclosure is not limited to external environment 111 and can utilize data sources from internal environments including, but not limited to, a Wiki, a Knowledge Base, an internal Web log, and the like.

As used herein, an organization 162 can be an business entity associated with one or more business rules 131. Organization 162 can include a structure, an activity, a process, an information, a resource, a goal, a constraint, a person, a computing device, a product, a service, and the like. Business rule 131 can be one or more policies associated with an operation, a definition and a constraint associated with the organization 162.

In dynamic data assessment phase 110, a data source 112 can be selected from an external environment. In one embodiment, the data source 112 can be heuristically determined from an external environment 111. In one configuration of the embodiment, historic Web browser data of a user can be utilized to determine relevant data sources 112. For example, the disclosure can determine commonly visited Web sites of a business analyst to establish useful data sources 112. In one instance, data source 112 can be manually registered via a traditional and/or proprietary registration mechanism. In another instance, data source 112 can be automatically registered based one or more rules.

In one instance, data feeds for commonly utilized data sources 112 can be identified which can be analyzed for dynamic data 114. Dynamic data 114 can be communicated to rule engine 118 which can semantically analyze the data 114 to extract relevant information 119. Information 119 can be transformed into a dynamic pattern 120 which can be employed to generate an appropriate business rule 140.

In rule generation phase 130, pattern 120 can be matched to one or more triggers 132 within engine 118. It should be appreciated that the matching can be a semantic matching which can include Boolean values (e.g., True/False), fuzzy logic values, and the like. In one instance, triggers 132 can be one or more patterns created from an existing business rule 131. For example, an existing business rule 131 can be transformed into a pattern (e.g., business pattern 133) which can be semantically matched with pattern 120.

In one embodiment, when pattern 120 fails to match a trigger 132, phase 110 can be repeated. In the embodiment, when phase 110 is run, a different data source and/or dynamic data can be selected which can yield a different pattern and the different pattern can be input into phase 130. In another embodiment, when pattern 120 matches a trigger 132 and a dynamic data change has been identified, a rule generation 134 action can be performed. The rule generation 134 action can be controlled via one or more settings, preferences, and the like. Generation 134 can produce rule 140 which can be a business rule established from pattern 120.

In rule deployment phase 150, a notification 152 can be conveyed to an interface 154. The notification 152 can include, but is not limited to, rule 140, rule 140 information, dynamic pattern 120, business rule 131, generation 134 information, and the like. In one instance, notification 152 can be presented to user 156 in real-time or near real-time. In one embodiment, notification 152 can permit the manual validation of rule 140 within interface 154. In another instance, engine 118 can automatically validate and deploy rule 140 via deployment 160. Deployment 160 can permit the usage of rule 140 within organization 162.

In one instance deployment phase 150 can include business rules for product pricing calculations, eligibility determinations, and the like. In the instance, phase 150 can provide an outcome of rule 140 processing. For example, a business analyst can preview changes which can occur within organization 162 from implementing rule 140.

Drawings presented herein are for illustrative purposes only and should not be construed to limit the invention in any regard. It should be appreciated that the scenario 100 is not limited to rule creation and can include rule modification (e.g., modifying, deletion). That is, disclosure can identify dynamic data feeds to be leveraged as input information for updating business rules while notifying various organization entities of the changes.

Figure 2:
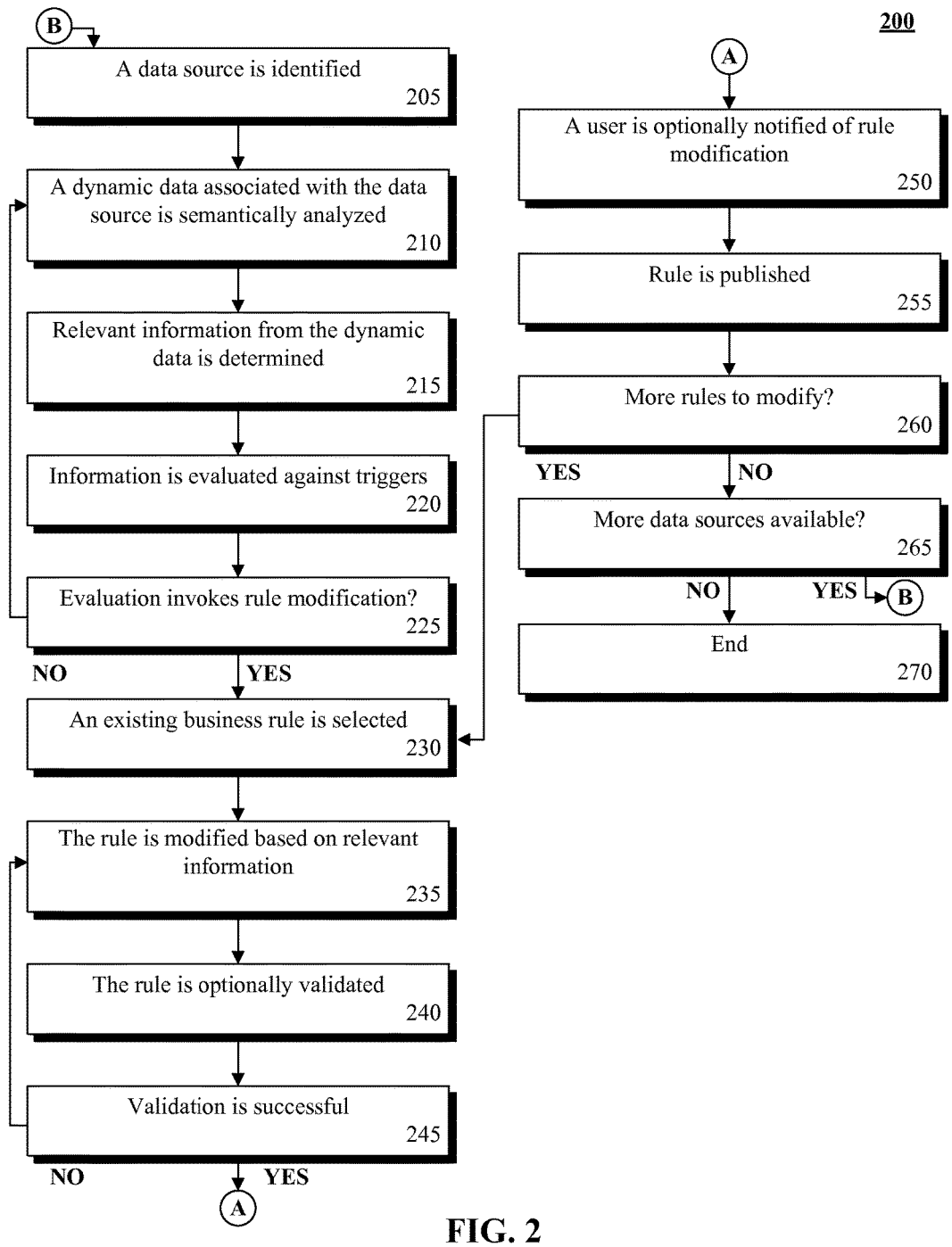
FIG. 2 is a schematic diagram illustrating a method for utilizing a dynamic data source to affect business rule management in accordance with an embodiment of the inventive arrangements disclosed herein.

FIG. 2 is a schematic diagram illustrating a method 200 for utilizing a dynamic data source to affect business rule management in accordance with an embodiment of the inventive arrangements disclosed herein. Method 200 can be performed in the context of scenario 100 and/or system 300. In method 200, a dynamic data associated with a data source can be utilized to dynamically alter business rules of a business rules management system of an organization. In the method, semantic analysis can be leveraged to determine relevant information (e.g., dynamic pattern) which can be employed to create new business rules and/or modify existing business rules based on the information.

In step 205, a data source can be identified. In one instance, the source can be manually and or automatically identified. In one configuration of the instance, the source can be identified from a data source registry which can be programmatically maintained. In step 210, a dynamic data associated with the data source can be semantically analyzed. In one embodiment, semantic analysis can utilize an ontology chart enabling semantic relationships to be determined and employed to create and/or modify business rules. In step 215, relevant information from the dynamic data can be determined. In one embodiment, relevant information can be determined via semantic pattern matching. In step 220, the information can be evaluated against triggers to determine a pertinent business rule.

In step 225, if the evaluation invokes a rule modification, the method can continue to step 230, else return 210. In step 230, an existing business rule can be automatically and/or manually selected based on relevancy of step 225. For example, an end user or analyst can utilize an interface to select an existing business rule. In step 235, the rule can be modified based on the relevant information. For example, the dynamic pattern of the relevant information can be utilized to modify the existing business rule. In step 240, the rule can be optionally validated by the automatically identified owner/creator. In one instance, the rule can be manually and/or automatically validated. For example, the rule can be validated by a financial analyst associated with the organization. In step 245, if the validation is successful, the method can continue to step 250, else return to step 235. In step 250, a user can be optionally notified of rule modification. Notification can be performed in real-time or near real-time. In step 225, the rule can be published. In step 260, if there are more rules to modify, the method can return to step 230, else continue to step 265. In step 265, if there are more data sources available, the method can return to step 205, else continue to step 270. In step 270, the method can end.

Drawings presented herein are for illustrative purposes only and should not be construed to limit the invention in any regard. It should be appreciated that steps 205-270 can be performed in real-time or near real-time. In one embodiment, method 200 can be performed within the context of a Service Oriented Architecture. Method 200 can be performed in parallel and/or in serial.

Figure 3:
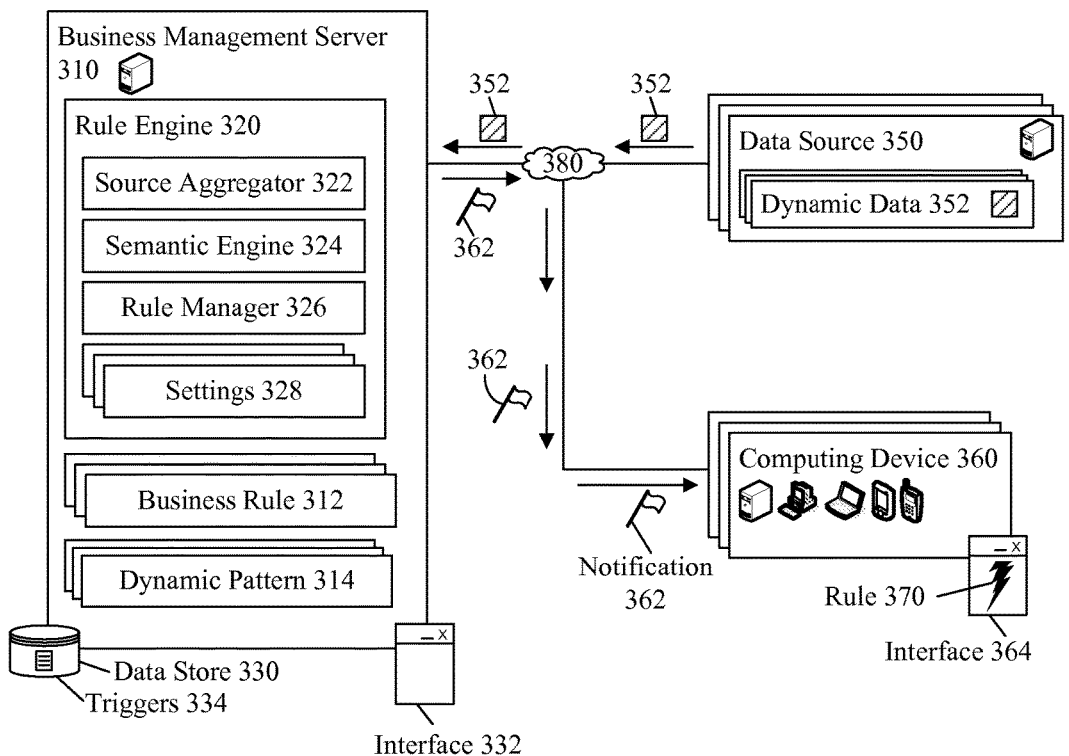
FIG. 3 is a schematic diagram illustrating a system for utilizing a dynamic data source to affect business rule management in accordance with an embodiment of the inventive arrangements disclosed herein.

FIG. 3 is a schematic diagram illustrating a system 300 for in accordance with an embodiment of the inventive arrangements disclosed herein. System 300 can be present in the context of scenario 100 and/or method 200. In system 300, a dynamic data 352 can be employed within a rule engine 320 of a business management server 310 to programmatically adjust business rules 312. Adjustment can be performed in real-time or near real-time utilizing triggers 334. It should be appreciated one or more entities within the system 300 can be optional providing the functionality is maintained. System 300 components can be communicatively linked via one or more networks 380.

In system 300, dynamic data 352 can be communicated from data source 350 to server 310. Engine 320 within server 310 can process the data 352 to determine dynamic pattern 314 which can be semantically matched to a business pattern (e.g., extracted from business rule 312). Engine 320 can leverage triggers 334 to determine an appropriate business rule management action. Responsive to the action, an appropriate notification 362 can be conveyed to a computing device 360. For example, when a new rule is dynamically created, a rule creation notification can be presented within interface 364.

Business management server 310 can be a hardware/software component able to execute rule engine 320. Server 310 can include, but is not limited to, engine 320, business rule 312, pattern 314, data store 330, interface 332, and the like. Server 310 functionality can include, but is not limited to, authentication, encryption, session management, and the like. In one embodiment, server 310 can be an application similar to IBM BUSINESS RULE MANAGEMENT SOFTWARE.

Rule engine 320 can be a hardware/software element configured to adjust business rule 312 responsive to dynamic data 352. Engine 320 can include, but is not limited to, source aggregator 322, semantic engine 324, rule manager 326, settings 328, and the like. Engine 320 functionality can include, but is not limited to, facts, priority (score), mutual exclusion, preconditions, and the like. In one embodiment, engine 320 can be a "drop-in replacement" to an existing business rule engine. In another embodiment, engine 320 can execute as an enhancement to an existing business rule engine.

Source aggregator 322 can be a hardware/software component for identifying data source 350. Aggregator 322 functionality can include, but is not limited to, source 350 registration, source 350 validation, source 350 selection, and the like. In one instance, aggregator 322 can be utilized to leverage user generated content from a social network. In the instance, aggregator 322 can determine relevant entities (e.g., users) which can provide relevant information. Aggregator 322 can utilize mechanisms, including, but not limited to, source prioritization, source rating, and the like. For example, aggregator 322 can automatically rate data sources which produce rules 370 of high value. That is, aggregator 322 can programmatically cull sources 350 with low relevancy.

Semantic engine 324 can be a hardware/software element for determining a dynamic data 352 and/or dynamic pattern 314. Engine 324 functionality can include, but is not limited to, searching, filtering, pattern generation (e.g., pattern 314), ontology creation, and the like. In one instance, engine 324 can support traditional and/or proprietary search syntax, functionality, and the like. In the instance, engine 324 can support Boolean expressions, fuzzy logic expressions, and the like. It should be appreciated that engine 324 can include history tracking (e.g., historic search criteria), session tracking, and the like.

Rule manager 326 can be a hardware/software component for establishing a rule 370 and/or triggers 334. Manager 326 functionality can include, but is not limited to, rule 312, 370 registration, rule 312, 370 presentation, authoring information presentation, owner information presentation, affected user presentation (e.g., users affected by rule change/creation), and the like. In one instance, manager 326 can include a rule agent able to determine a rule 370 creation and/or a rule 312 modification. It should be appreciated that manager 326 functionality can include traditional rule monitoring capabilities. In one embodiment, manager 326 can be utilized to resolve rule 312, 370 conflicts. In the embodiment, conflict resolution can be performed in a traditional and/or proprietary manner. For example, settings 328 can be utilized to automatically resolve rule 312, 370 conflicts.

Settings 328 can be a set of options for configuring the behavior of system 300, server 310, and/or rule engine 320. Settings 328 can include, but is not limited to, source aggregator 322 options, semantic engine 324 preferences, rule manager 326 options, affected organization hierarchy, affected users, rule owner(s), and the like. Settings 328 can be manually and/or automatically established. In one instance, settings 328 can be heuristically determined from historic settings. In another instance, settings 328 can be manually configured via interface 332.

Business rule 312, 370 can conform to one or more traditional and/or proprietary rule syntaxes. In one instance, rule 312, 370 can conform to a simple if/then conditional statement. In another instance, rule 312, 370 can include multiple executable expressions and/or statements. That is, rule 312 can be arbitrarily complex. Rule 312, 370 can be presented within interface 332 and/or interface 364.

Dynamic pattern 314 can be a semantic pattern associated with rule 312, and/or dynamic data 352. Pattern 314 can include, but is not limited to, a regular expression, a keyword, a unique identifier, an attribute/value pairing, and the like. In one instance, dynamic pattern 314 can be persisted enabling rapid reuse of historic patterns. In one embodiment, dynamic pattern 314 can be extracted from dynamic data 352 by engine 320.

Data store 330 can be a hardware/software component able to persist triggers 334, business rule 312, dynamic pattern 314, notification 362, rule 370, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310, engine 320 in one or more traditional and/or proprietary mechanisms. In one instance, data store 330 can be a component of Structured Query Language (SQL) database.

Interface 332 can be a user interactive component permitting interaction and/or presentation of rule 312, pattern 314, rule 370, and/or notification 362. Interface 332 can be present within the context of a Web browser application, an integrated development environment (IDE), and the like. Interface 332 capabilities can include a graphical user interface (GUI), voice user interface (VUI), mixed-mode interface, and the like. In one instance, interface 332 can be communicatively linked to computing device.

Triggers 334 can be one or more event-driven entities associated with rule engine 320. Triggers 334 can include, event-driven executable code, a database trigger, and the like. Triggers 334 can include, but is not limited to, a pattern identifier, a match value, an executable action, and the like. In one instance, triggers 334 can include a policy for performing a business rule management action. For example, entry 336 can be a policy for creating a rule when there is a ninety percent match between a dynamic pattern and a business pattern (e.g., pattern extracted from business rule 312).

Data source 350 can be one or more computing systems communicatively linked to dynamic data 352. Source 350 can include one or more heterogeneous systems, homogenous systems, and the like. Source 350 can include one or more traditional platforms, communication protocols, storage protocols, organization methodologies, and the like. For example, source 350 can be a distributed computing environment such as a cloud. Source 350 can include traditional and/or proprietary systems. Source 350 can include, dynamic data 352, dynamic data 352 metadata, social media data, and the like.

Dynamic data 352 can include, but is not limited to, traditional and/or proprietary data formats. Formats can include, but is not limited to, text, Hypertext Markup Language (HTML), Extensible Markup Language (XML), Unified Modeling Language (UML), and the like. Data 352 can be associated with one or more security measures including, but not limited to, encryption, compartmentalization, and the like.

Computing device 360 can be a hardware/software permitting the processing and/or presentation of rule 370. Device 360 can include, but is not limited to, interface 364, device 360 settings, and the like. Computing device 360 can include, but is not limited to, a desktop computer, a laptop computer, a tablet computing device, a PDA, a mobile phone, and the like. Computing device 360 can be communicatively linked with interface 362. In one instance, interface 362 can present interface 364.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. System 300 can be a component of a distributed computing environment, networked computing environment, and the like. In one instance, system 300 can be a component of a Service Oriented Architecture. One or more components of engine 320 can be present and/or optionally omitted permitting the functionality of the engine 320 is retained. It should be appreciated that one or more components of engine 320 can be combined and/or separated based on functionality, usage, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Applicants expressly disclaim any embodiments from the scope of the claims expressed herein that are interpreted as being a non-statutory subject matter under operation of 35 USC 101. That is, the claims expressed herein are to be expressly restricted in scope to including only those embodiments that are statutory under operation of 35 USC 101.

What is claimed is:

1. A method for managing business rules comprising:
establishing a plurality of business rules within a business rule management system (BRMS) for a specific enterprise, wherein the business rule management system comprises hardware and software components;
retrieving Web browser data of an end user to identify a historically visited Web site and registering the historically visited Web site as a relevant data source in an external environment;
determining, by the business rule management system, relevant information for the specific enterprise from dynamic data associated with the relevant data source, wherein the determining occurs through semantic analysis of the dynamic data given the plurality of business rules established for the specific enterprise;
transforming the relevant information into a dynamic pattern;
semantically matching the dynamic pattern to a trigger in rule engine of the BRMS created from an existing one of the business rules, wherein the one of the business rules is at least one of an operation, a definition, and a constraint defined within the business rule management system for the specific enterprise; and
on condition that the dynamic pattern matches the trigger, generating a rule from the dynamic pattern, validating the generated rule and deploying the rule for use in the specific enterprise but otherwise on condition that the dynamic pattern does not match the trigger, repeating the retrieving of Web browser data of an end user to identify a different historically visited Web site and registering the different historically visited Web site as a different relevant data source in the external environment, determining, by the business rule management system, different relevant information from different dynamic data associated with the different relevant data source, transforming the different relevant information into a different dynamic pattern and semantically matching the different dynamic pattern to a different trigger in the rule engine of the BRMS created from an existing one of the business rules.

2. The method of 1, further comprising:
automatically modifying, by the business rule management system, the business rule responsive to the matching, wherein the modifying changes the rule to match the dynamic pattern.

3. The method of claim 1, further comprising:
automatically generating, by the business rule management system, a new business rule based on the pattern associated with the dynamic pattern.

4. The method of claim 3, further comprising:
automatically publishing, by the business rule management system, the business rule within the business rule management system.

5. The method of claim 1, further comprising:
automatically registering, by the business rule management system, at least one of the data source, the rule, and the business pattern within the business rule management system.

6. The method of claim 1, wherein dynamic data is associated with at least one of an internal data source associated with the enterprise and an external data source associated with the enterprise, wherein the dynamic data is at least one of a Rich Site Summary (RSS) feed, an ATOM feed, an industry Web log, a Web site, a regulatory Web site, a trading report, and a commodities pricing.

7. The method of claim 1, wherein data source is at least one of a Big Data and a social network.

8. The method of claim 1, further comprising:
dynamically generating, by the business rule management system, a notification responsive to the matching, wherein the notification is at least one of a aural notification and a visual notification;
identifying, by the business rule management system, at least one of an owner and a group associated with the business rule; and
conveying, by the business rule management system, the notification to the at least one owner and group.

9. The method of claim 1, further comprising:
automatically filtering, by the business rule management system, the data source for dynamic data associated with the business pattern.

10. A system for business rule management comprising:
one or more processors;
one or more non-transitory storage mediums storing program instructions of a business rule management system;
a rule engine, comprising at least a subset of the program instructions of the business rule management system, wherein execution of the subset by the processor causes the system to dynamically manage a business rule associated with a business rule management system based on relevant information, wherein the execution of the subset of the program instructions further causes the system to retrieve Web browser data of an end user to identify a historically visited Web site and to register the historically visited Web site as a relevant data source in an external environment, to determine relevant information from dynamic data associated with the relevant data source, wherein the determining occurs through semantic analysis of the dynamic data given the business rule, to transform the relevant information into a dynamic pattern, to semantically match the dynamic pattern to a trigger in rule engine of the BRMS created from an existing one of the business rules wherein the one of the business rules is at least one of an operation, a definition, and a constraint defined within the business rule management system for the specific enterprise, and on condition that the dynamic pattern matches the trigger, to generate a rule from the dynamic pattern, validating the generated rule and deploying the rule for use in the specific enterprise but otherwise on condition that the dynamic pattern does not match the trigger, to repeat the retrieving of Web browser data of an end user to identify a different historically visited Web site and registering the different historically visited Web site as a different relevant data source in the external environment, determining, by the business rule management system, different relevant information from different dynamic data associated with the different relevant data source, transforming the different relevant information into a different dynamic pattern and semantically matching the different dynamic pattern to a different trigger in the rule engine of the BRMS created from an existing one of the business rules;
a data store configured to persist at least one of the dynamic pattern, the Web browser data, the trigger, and the rule.

11. The system of claim 10, further comprising:
a source aggregator, comprising at least a subset of the program instructions, wherein execution of the subset by the processor causes the system to register at least one data source associated with the dynamic data;
a semantic engine, comprising at least a subset of the program instructions, wherein execution of the subset by the processor causes the system to determine a semantic match between the dynamic data and the business pattern; and
a rule manager, comprising at least a subset of the program instructions, wherein execution of the subset by the processor causes the system configured to establish a new rule based on the dynamic data.

12. The system of claim 11, wherein the new rule is automatically published within the business rule management system.

13. The system of claim 11, further comprising:
a notification component, comprising at least a subset of the program instructions, wherein execution of the subset by the processor causes the system to dynamically generate a notification responsive to at least one of the semantic matching and the establishing, wherein the notification is at least one of an electronic mail notification, a Short Message Service (SMS) notification, a telephony based notification, a user interface notification, and a text exchange notification.

14. The system of claim 10, wherein the dynamic data is associated with a semantic pattern.

15. The system of claim 10, wherein the rule is dynamically modified based on the dynamic data.

16. The system of claim 10, wherein dynamic data is associated with at least one of an internal data source associated with the enterprise and an external data source associated with the enterprise, wherein the dynamic data is at least one of a Rich Site Summary (RSS) feed, an ATOM feed, an industry Web log, a Website, a regulatory Website, a trading report, and a commodities pricing.

17. The system of claim 10, wherein data source is at least one of a Big Data and a social network.

18. A computer program product for business rule management, the computer program product comprising a non-transitory computer readable storage medium having program instructions embodied therewith, the program instructions being executable by a device to cause the device to perform a method comprising:
retrieving Web browser data of an end user to identify a historically visited Web site and registering the historically visited Web site as a relevant data source in an external environment;
determining relevant information from dynamic data associated with the relevant data source, wherein the determining occurs through semantic analysis of the dynamic data given the business rule;
transforming the relevant information into a dynamic pattern;
semantically matching the dynamic pattern to a trigger in rule engine of the BRMS created from an existing one of the business rules, wherein the one of the business rules is at least one of an operation, a definition, and a constraint defined within the business rule management system for the specific enterprise; and
on condition that the dynamic pattern matches the trigger, generating a rule from the dynamic pattern, validating the generated rule and deploying the rule for use in the specific enterprise but otherwise on condition that the dynamic pattern does not match the trigger, repeating the retrieving of Web browser data of an end user to identify a different historically visited Web site and registering the different historically visited Web site as a different relevant data source in the external environment, determining, by the business rule management system, different relevant information from different dynamic data associated with the different relevant data source, transforming the different relevant information into a different dynamic pattern and semantically matching the different dynamic pattern to a different trigger in the rule engine of the BRMS created from an existing one of the business rules.

* * * * *